June 4, 1940.　　　　　H. H. YERK　　　　　2,203,318
PROCESS FOR PREPARATION OF MEAT PRODUCTS
Filed July 20, 1939
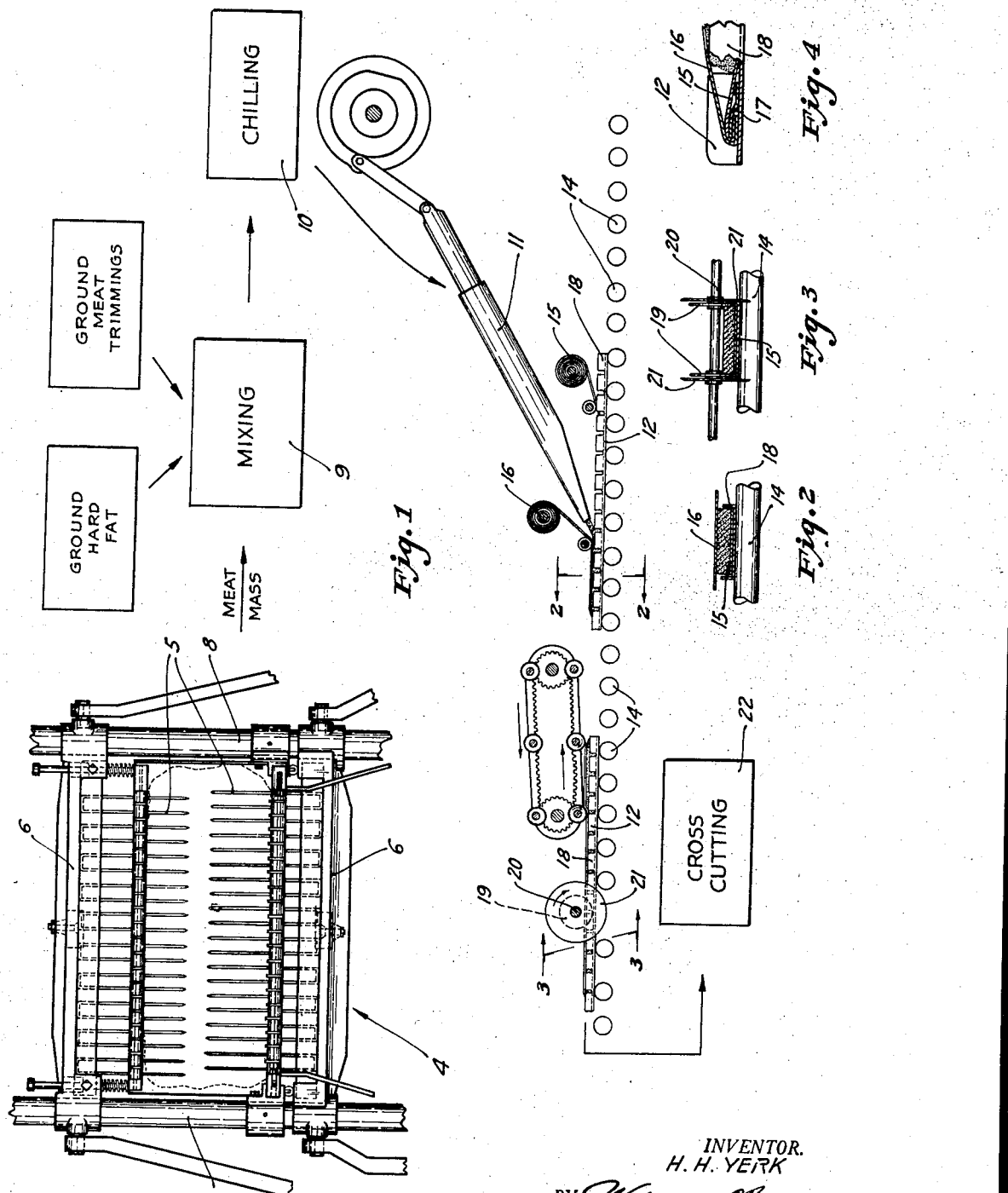
INVENTOR.
H. H. YERK
BY William C. Blackburn
ATTORNEY Patented June 4, 1940

2,203,318

UNITED STATES PATENT OFFICE 2,203,318

PROCESS FOR PREPARATION OF MEAT PRODUCTS

Henry H. Yerk, Chicago, Ill.

Application July 20, 1939, Serial No. 285,499

4 Claims. (Cl. 99—108)

The present invention relates to meat products and to processes for the preparation thereof, the products being in the nature of steaks.

Heretofore steaks have been prepared in several manners. The most common is merely by slicing a piece of meat. Not all meat is suitable for such steaks since some meat is too tough and other is in the form of scraps. The scraps have been turned into hamburger by grinding, and this is sometimes termed Salisbury steak though it does not have the properties of the steaks above described. Thus it does not fry, taste, chew, or look like a steak.

Tough meat has been successfully tendered by the process described in the Rasmussen Patent No. 1,987,349, in which the connective tissue is ruptured, leaving the meat fiber substantially intact. Very tender steaks may be produced by this method, but they are not particularly adapted as sandwich steaks. Such a process in which the connective tissue is ruptured should be distinguished from a "Frenched" steak, in which the meat fiber is pounded with a butcher's mallet, and from Swiss steak in which the meat is "Frenched" with flour. Such "Frenching" tenders the meat only in so far as it partially cuts up the meat fibers but has very little effect on the connective tissue which is the portion which, in fact, produces the toughness in meat.

Accordingly, it is an object of this invention to provide steaks of a size and thickness suitable for sandwich steaks and which are fully as tender as the most tender steaks of the customary variety, and which have the properties of such steaks.

A further object of this invention is the provision of a process for making tender steaks suitable for sandwich purposes in which meat may be used regardless of whether it is tough or tender.

In accordance with the present invention, steaks are produced by rupturing the connective tissue until the meat fibers have been disconnected sufficiently that the meat is a kneadable mass, by mixing the meat mass with ground hard fat, rolling the mixture to form a sheet of suitable thickness for cooking, whereby the meat fibers become compressed together and whereby the meat fibers become interlaced, and cutting the sheet of rolled meat into pieces of desired size.

The specific apparatus which may be employed in the performance of this process is various. Much of the process may be carried out by hand without the use of any special apparatus but with just conventional equipment and with hand tools. The accompanying drawing therefore shows the process by its steps and in certain instances, in order to make the meaning of the description of the process more lucid, there has been incidentally disclosed some apparatus which would be suitable, though for which other apparatus might be substituted. In the drawing, Fig. 1 is a flow sheet of the process;

Fig. 2 is a section subsantially on the line 2—2 of Fig. 1;

Fig. 3 is a section substantially on the line 3—3 of Fig. 1; and

Fig. 4 is a longitudinal section through the leading end of the meat-forming tray.

For my process, any meat may be employed, though I prefer for obvious reasons to employ a good grade of meat. It is not necessary for the meat to be tender. This process may be used to good advantage with rather tough round steak for instance. To prepare the meat for use, one should initially slice the meat to a suitable thickness for use in the tendering machine and remove the bone from the slices.

The meat prepared as above stated is ready for machine treatment. In this machine, the connective tissue in the meat, which is the cause of toughness, is ruptured and the meat fibers are torn apart sufficiently to produce a meat mass which can be kneaded to desired form. It should be understood that by this I do not mean to indicate that the fibers of the meat are individualized. Such is not only not produced by the machine but would be an undesirable result. In this tenderizing step of the process, the piece of meat is supported in a position to be operated upon, elongated hook members are inserted into the meat and withdrawn therefrom, thus pulling and breaking the connective tissue, whereby the meat is made tender, and the operation is repeated until the meat fibers are pulled apart sufficiently to produce a kneadable meat mass.

This described step of the process may be performed in a machine 4 shown diagrammatically in Fig. 1. For a further description of this machine and of the mechanical equivalents thereof, reference may be had to U. S. Patent No. 1,987,- 349, granted January 8, 1935, to A. O. Rasmussen. For the purposes of this description, it is believed adequate to state that each of the fingers 5 is provided with either a pulling or pushing hook and is mounted in one of the supporting frames 6. Supports 7 and 8 are mounted on suitable framework and are provided to support the supporting frames.

It is in general desirable to trim out rather lean meat for the machine tendering operation. Therefore, if the meat mass from this step of the process were made into form and cooked, the product would be rather dry and lacking in certain desirable portions of the customary meat juices. This deficiency may be made up by adding to the meat mass a suitable amount of fat. In trimming up a "hind," there is a considerable quantity of "layer fat" along with the meat trimmed off. I have found that these trimmings may be ground and added to the meat mass obtained from the machine in considerable proportion without substantially modifying the properties of the steaks produced. Thus I prefer to employ about equal weights of the meat mass and the described ground meat. The fact is that the meat mass, even in minor percentage, acts to bind the ground meat into a steak of desirable properties. Ground hard fat may also be added, to supplement or replace the fat carried by the trimmings. The amount of ground hard fat added depends substantially upon the amount of fat in the ground meat employed and upon the proportion of ground meat to meat mass employed. When average hinds are used and all the meat and fat thereof used to produce the meat mixture, it is generally desirable to add the ground hard fat in the amount of six to eight per cent. In case lean trimmed meat is employed for making the meat mass, and the meat trimmings which contain the fat are diverted to other purposes, somewhat more than six to eight per cent of the fat may well be used in order to avoid dryness in the steaks.

The meat mixed as indicated at 9 is chilled as indicated at 10, preferably to a temperature of between about 35 and about 65 degrees. While it is not essential that the temperature be adjusted to this range, it is of assistance in the forming step of the process since at higher temperatures the meat does not hold its formed shape quite as well.

The meat prepared as indicated above is then formed into steaks by rolling the meat on a flat surface and trimming to the desired size. It is preferable to extrude the meat through an orifice and to lay the meat so extruded on the surface upon which it is to be rolled inasmuch as the extrusion tends to align the meat fibers generally in the direction of extrusion. Thus the chilled meat may be introduced into the extruder 11 which has a wide orifice. A tray 12 may be movable along rollers 14 under the orifice. Papers from the rolls 15 and 16 are secured in clip 17 at the leading end of the tray, the paper from the roll 15 being the width of the tray, and that from roll 16 being on top and somewhat wider than the tray. The meat is extruded into position between the papers as the tray moves to the left under the orifice as shown in the drawing.

After the meat is placed in position between the papers, the tray 12 which is provided with side rails 18 may be passed under rollers in order to roll the meat down to the level of the side rails. The pressure rolls may be mounted to move in an endless path the last roll under which the tray passes being pressed against the rails and the preceding rolls each being spaced from the tray more than the next succeeding roll. The result of rolling is that the meat is compacted and is caused to spread along the tray. With a long tray, as shown, considerable extension of the meat is obtained. This results in the steaks produced being in a form in which the fibers of the meat mass are felted together, whereby the steaks hold together firmly and do not fall apart, as is the case with hamburgers. Also, the rolling produces a smooth surface of such felted meat fiber so that the surfaces of the steaks may be seared, and they do not crack open letting the juice out as is customary with hamburgers.

The meat and paper are cut just inside of the side rails of the forming tray, as with a pair of disc knives 19 on shaft 20, a pair of guide discs 21 being mounted on shaft 20 just outside of the disc knives in order to guide the tray accurately. The side rails of the tray are provided with notches extending to the plane of the bottom of the tray through which knives may pass in the cross-cutting operation 22 immediately following the side cutting. This operation may be performed by any suitable machine, if desired, or otherwise by hand. After cross-cutting, the steaks in the tray which are papered on both sides are ready for packaging for subsequent use or for storage for future sale.

It is to be understood that none of the machinery shown constitutes any part of the present invention but that the steps of this process may be performed by hand or by appropriate hand tools. It should also be understood that the scope of this invention is limited only by the subjoined claims and that statements of preference and possibility made hereinabove should not be considered in a limiting sense.

Having now described my invention, I claim:

1. The method of preparing a meat product comprising supporting a piece of meat in a position to be operated upon, inserting elongated hooked members into the meat and withdrawing the same therefrom thus rupturing the connective tissue, repeating said inserting and withdrawing until the meat is a kneadable mass, and rolling the mass to form a sheet of suitable thickness for cooking, whereby the meat fibers become compressed together and interlaced.

2. The method of preparing a meat product comprising supporting a piece of meat in a position to be operated upon, inserting elongated hooked members into the meat and withdrawing the same therefrom thus rupturing the connective tissue, repeating said inserting and withdrawing until the meat is a kneadable mass, extruding the mass, and rolling the extruded meat in a plane parallel to the general direction of extrusion of the meat to form a sheet of suitable thickness for cooking, whereby the meat fibers become compressed together and interlaced.

3. The method of preparing a meat product comprising supporting a piece of meat in a position to be operating upon, inserting elongated hooked members into the meat and withdrawing the same therefrom thus rupturing the connective tissue, repeating said inserting and withdrawing until the meat is a kneadable mass, adding a fat-containing material to the mass, mixing the mass and said fat-containing material, and rolling the mass to form a sheet of suitable thickness for cooking, whereby the meat fibers become compressed together and interlaced.

4. The method of preparing a meat product comprising supporting a piece of meat in a position to be operated upon, inserting elongated hooked members into the meat and withdrawing the same therefrom thus rupturing the connective tissue, repeating said inserting and withdrawing until the meat is a kneadable mass, placing the mass between sheets of paper, and rolling the mass while between the sheets to form a sheet of meat of suitable thickness for cooking, whereby the meat fibers become compressed and interlaced.

HENRY H. YERK.